(12) United States Patent
Fonseca et al.

(10) Patent No.: US 10,701,602 B2
(45) Date of Patent: Jun. 30, 2020

(54) CELL RESELECTION TO HIGH PRIORITY NEIGHBOR CELLS

(71) Applicant: QUALCOMM Incorporated, San Diego, CA (US)

(72) Inventors: Leopoldo Guilherme Otto Fonseca, Sao Paulo (BR); Eduardo Lichtenfels Riccio, Sao Paulo (BR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/999,024

(22) Filed: Aug. 20, 2018

(65) Prior Publication Data

US 2020/0059837 A1    Feb. 20, 2020

(51) Int. Cl.
*H04W 4/00* (2018.01)
*H04W 36/00* (2009.01)
*H04W 36/08* (2009.01)
*H04W 36/30* (2009.01)

(52) U.S. Cl.
CPC . *H04W 36/0085* (2018.08); *H04W 36/00837* (2018.08); *H04W 36/08* (2013.01); *H04W 36/30* (2013.01)

(58) Field of Classification Search
USPC ............... 370/332, 331, 252, 328, 329, 335
See application file for complete search history.

(56) References Cited

U.S. PATENT DOCUMENTS 9,408,130 B1 *   8/2016   Kotreka ................ H04W 76/38

\* cited by examiner

*Primary Examiner* — Phuongchau Ba Nguyen
(74) *Attorney, Agent, or Firm* — Dalei Dong; Harrity & Harrity LLP

(57) ABSTRACT

In some aspects, a user equipment may determine whether a neighbor cell satisfies a first suitability condition that indicates whether the neighbor cell is suitable for reselection from a serving cell; selectively determine, based at least in part on whether the neighbor cell satisfies the first suitability condition, whether the neighbor cell satisfies a variation condition that indicates whether the neighbor cell is getting stronger over time as compared to the serving cell; selectively determine, based at least in part on whether the neighbor cell satisfies the variation condition, whether the neighbor cell satisfies a second suitability condition that indicates whether the neighbor cell is suitable for reselection from the serving cell; and selectively reselect to the neighbor cell based at least in part on at least one of the first suitability condition, the variation condition, or the second suitability condition. Numerous other aspects are provided.

30 Claims, 5 Drawing Sheets

CELL RESELECTION TO HIGH PRIORITY NEIGHBOR CELLS

FIELD OF THE DISCLOSURE

Aspects of the present disclosure generally relate to wireless communication, and more particularly to techniques and apparatuses for cell reselection to high priority neighbor cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether a neighbor cell satisfies a first suitability condition that indicates whether the neighbor cell is suitable for reselection from a serving cell; selectively determining, based at least in part on whether the neighbor cell satisfies the first suitability condition, whether the neighbor cell satisfies a variation condition that indicates whether the neighbor cell is getting stronger over time as compared to the serving cell; selectively determining, based at least in part on whether the neighbor cell satisfies the variation condition, whether the neighbor cell satisfies a second suitability condition that indicates whether the neighbor cell is suitable for reselection from the serving cell; and selectively reselecting to the neighbor cell based at least in part on at least one of the first suitability condition, the variation condition, or the second suitability condition.

In some aspects, a UE for wireless communication may include memory and one or more processors operatively coupled to the memory. The memory and the one or more processors may be configured to determine whether a neighbor cell satisfies a first suitability condition that indicates whether the neighbor cell is suitable for reselection from a serving cell; selectively determine, based at least in part on whether the neighbor cell satisfies the first suitability condition, whether the neighbor cell satisfies a variation condition that indicates whether the neighbor cell is getting stronger over time as compared to the serving cell; selectively determine, based at least in part on whether the neighbor cell satisfies the variation condition, whether the neighbor cell satisfies a second suitability condition that indicates whether the neighbor cell is suitable for reselection from the serving cell; and selectively reselect to the neighbor cell based at least in part on at least one of the first suitability condition, the variation condition, or the second suitability condition.

In some aspects, a non-transitory computer-readable medium may store one or more instructions for wireless communication. The one or more instructions, when executed by one or more processors of a UE, may cause the one or more processors to determine whether a neighbor cell satisfies a first suitability condition that indicates whether the neighbor cell is suitable for reselection from a serving cell; selectively determine, based at least in part on whether the neighbor cell satisfies the first suitability condition, whether the neighbor cell satisfies a variation condition that indicates whether the neighbor cell is getting stronger over time as compared to the serving cell; selectively determine, based at least in part on whether the neighbor cell satisfies the variation condition, whether the neighbor cell satisfies a second suitability condition that indicates whether the neighbor cell is suitable for reselection from the serving cell; and selectively reselect to the neighbor cell based at least in part on at least one of the first suitability condition, the variation condition, or the second suitability condition.

In some aspects, an apparatus for wireless communication may include means for determining whether a neighbor cell satisfies a first suitability condition that indicates whether the neighbor cell is suitable for reselection from a serving cell; means for selectively determining, based at least in part on whether the neighbor cell satisfies the first suitability condition, whether the neighbor cell satisfies a variation condition that indicates whether the neighbor cell is getting stronger over time as compared to the serving cell; means for selectively determining, based at least in part on whether the neighbor cell satisfies the variation condition, whether the neighbor cell satisfies a second suitability condition that indicates whether the neighbor cell is suitable for reselection from the serving cell; and means for selectively reselecting to the neighbor cell based at least in part on at least one of the first suitability condition, the variation condition, or the second suitability condition.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
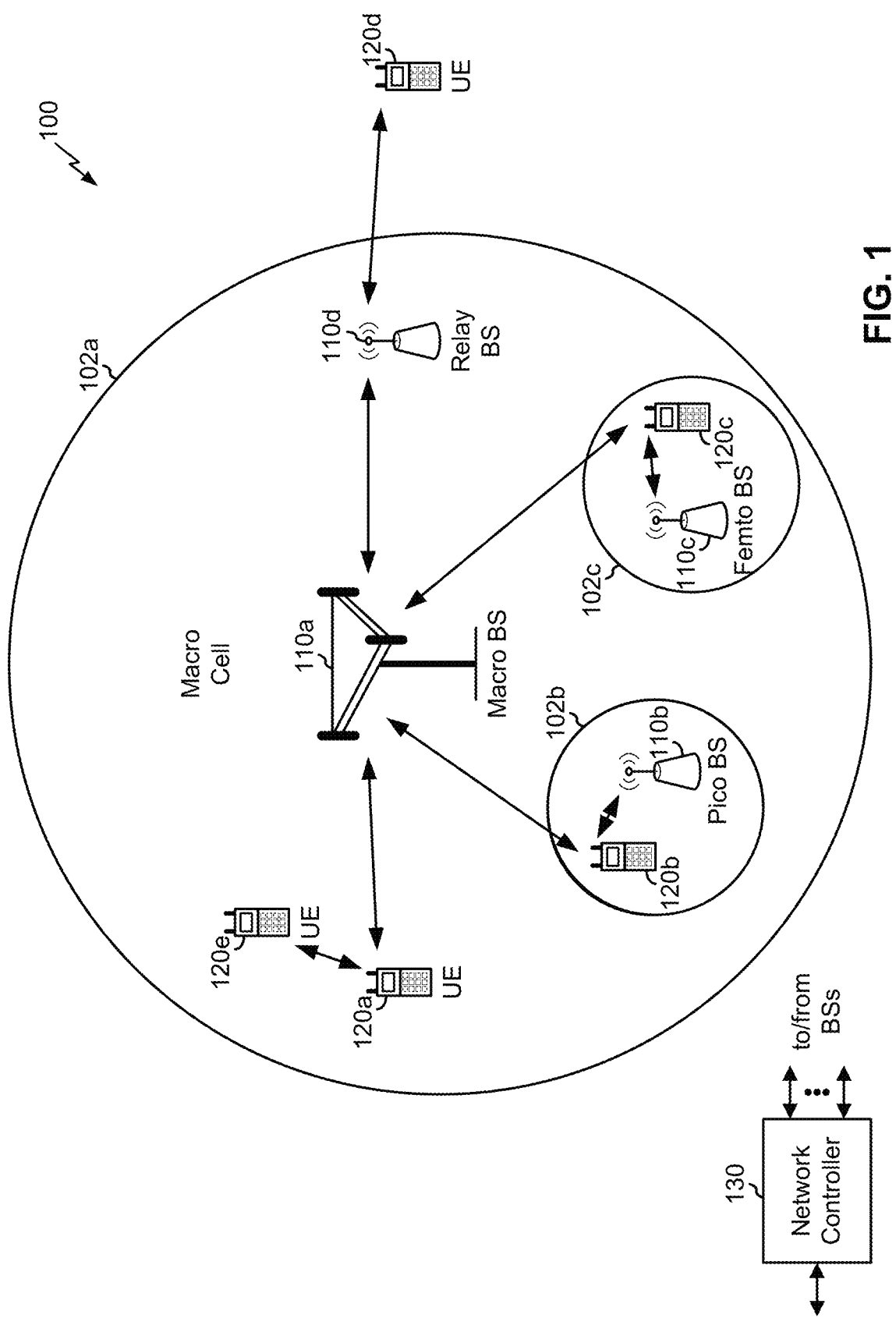
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
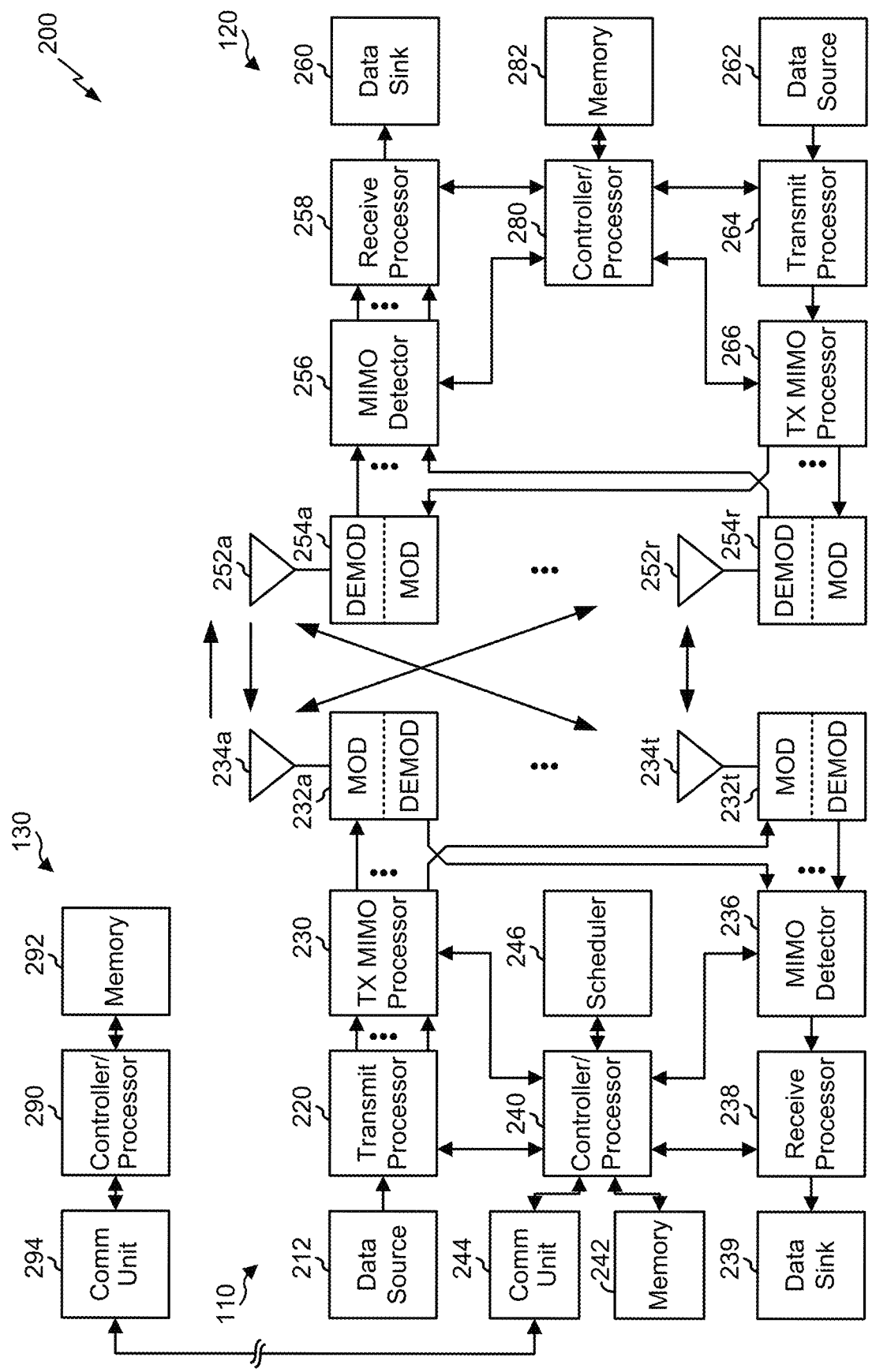
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cell reselection to high priority neighbor cells, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining whether a neighbor cell satisfies a first suitability condition that indicates whether the neighbor cell is suitable for reselection from a serving cell; means for selectively determining, based at least in part on whether the neighbor cell satisfies the first suitability condition, whether the neighbor cell satisfies a variation condition that indicates whether the neighbor cell is getting stronger over time as compared to the serving cell; means for selectively determining, based at least in part on whether the neighbor cell satisfies the variation condition, whether the neighbor cell satisfies a second suitability condition that indicates whether the neighbor cell is suitable for reselection from the serving cell; means for selectively reselecting to the neighbor cell based at least in part on at least one of the first suitability condition, the variation condition, or the second suitability condition; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
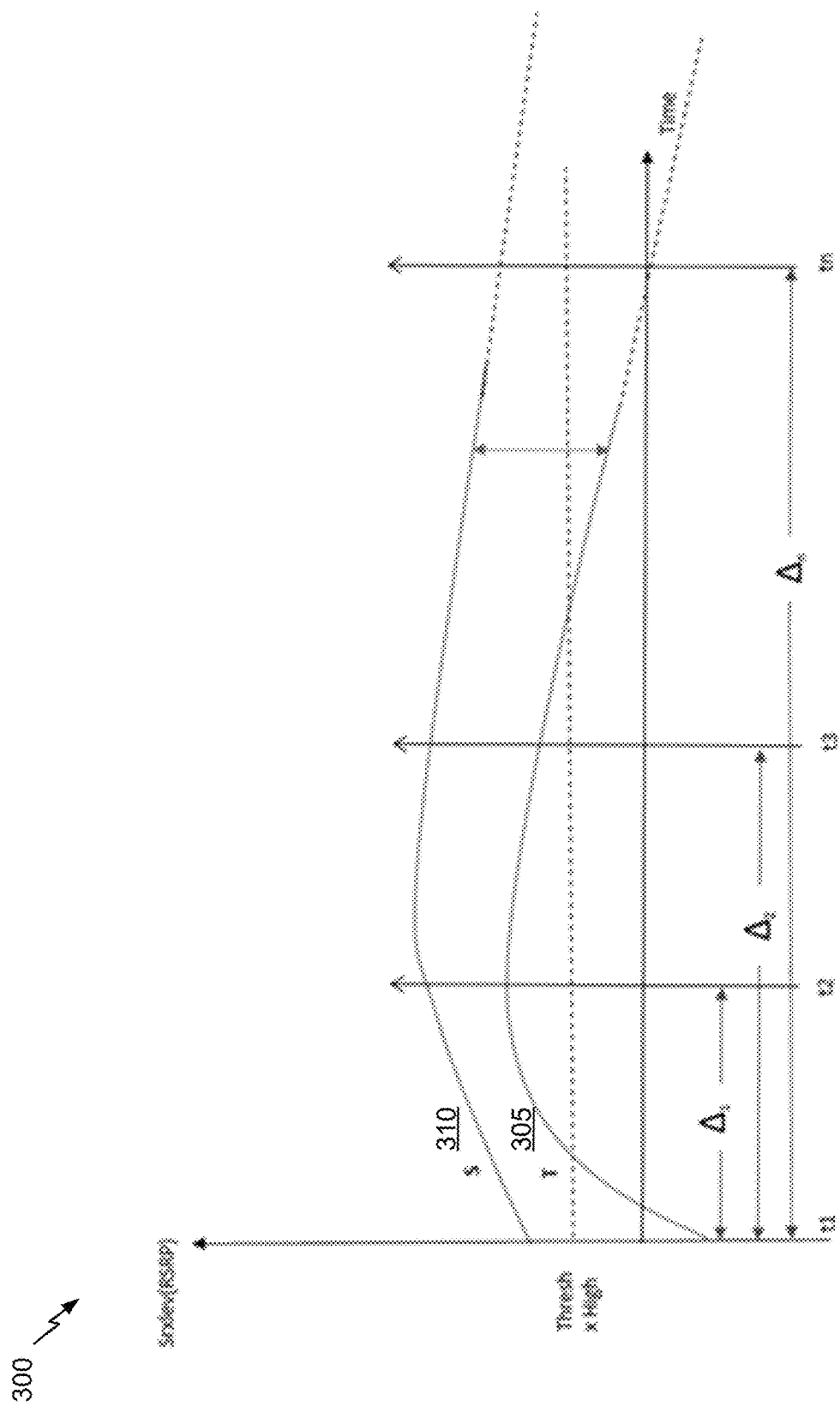
FIG. 3 is a diagram illustrating an example of reference signal received power (RSRP) variation between a low priority serving cell and a high priority neighbor cell, in accordance with various aspects of the present disclosure.

FIG. 3 is a diagram illustrating an example 300 of RSRP variation between a low priority serving cell and a high priority neighbor cell, in accordance with various aspects of the present disclosure.

As shown in FIG. 3, a cell selection criteria (e.g., S criteria, shown as Srxlev, which is a function of RSRP) for a neighbor cell 305 that is a target for reselection (shown as T) may be lower than a cell selection criteria for a serving cell 310 (shown as S). However, the neighbor cell 305 may be associated with a higher priority than the serving cell 310. In some cases, a network operator (e.g., a public land mobile network (PLMN) operator and/or the like) may configure different priorities for different cells (e.g., of the same PLMN) to avoid cell overloading, and the priorities may be used by the UE 120 during cell selection or cell reselection.

For example, cells that operate using different bands may have different coverage areas due to different operating frequencies (e.g., a higher frequency band may have a smaller coverage area, while a lower frequency band may have a larger coverage area). Without cell prioritization, UEs 120 may tend to select cells with lower operating frequencies and wider coverage because these cells tend to have better radio frequency (RF) conditions than cells with higher operating frequencies. As a result, cells with lower operating frequencies may become overloaded, while cells with higher operating frequencies may be underutilized. To counteract this tendency, the network operator may configure a higher priority for a cell with a higher operating frequency and a lower priority for a cell with a lower operating frequency. When a UE 120 performs cell selection or cell reselection, the UE 120 may prioritize a higher priority cell over a lower priority cell even if the UE 120 measures better RF conditions (e.g., S criteria, RSRP, RSRQ, RSSI, SINR, and/or the like) on the lower priority cell.

However, in some cases, when a higher priority neighbor cell 305 has worse RF conditions than a lower priority serving cell 310, the UE 120 may reselect from the serving cell 310 to the neighbor cell 305, may experience a communication failure, may reselect back to the serving cell 310, may again reselect from the serving cell 310 to the neighbor cell 305, and so on. This ping-ponging between the serving cell 310 and the neighbor cell 305 may result in poor performance, unnecessary resource consumption (e.g., of network resources and/or UE resources, such as battery power, processing power, memory, and/or the like), communication delays, reselection failure, and/or the like.

Some techniques and apparatuses described herein permit a UE 120 to evaluate a higher priority neighbor cell 305 before reselecting from a lower priority serving cell 310 to the higher priority neighbor cell 305. For example, some techniques and apparatuses described herein permit a UE 120 to test a suitability condition and/or a variation condition to determine whether the higher priority neighbor cell 305 is a better option than the lower priority serving cell 310. In this way, ping-ponging between the serving cell 310 and the neighbor cell 305 may be reduced or eliminated, leading to better performance, conservation of resources (e.g., network resources and/or UE resources), fewer communication delays, avoidance or reduction of reselection failure, and/or the like. FIG. 3 will be used to explain aspects of the disclosure described below in connection with FIG. 4.

As indicated above, FIG. 3 is provided as an example. Other examples are possible and may differ from what was described with respect to FIG. 3.

Figure 4:
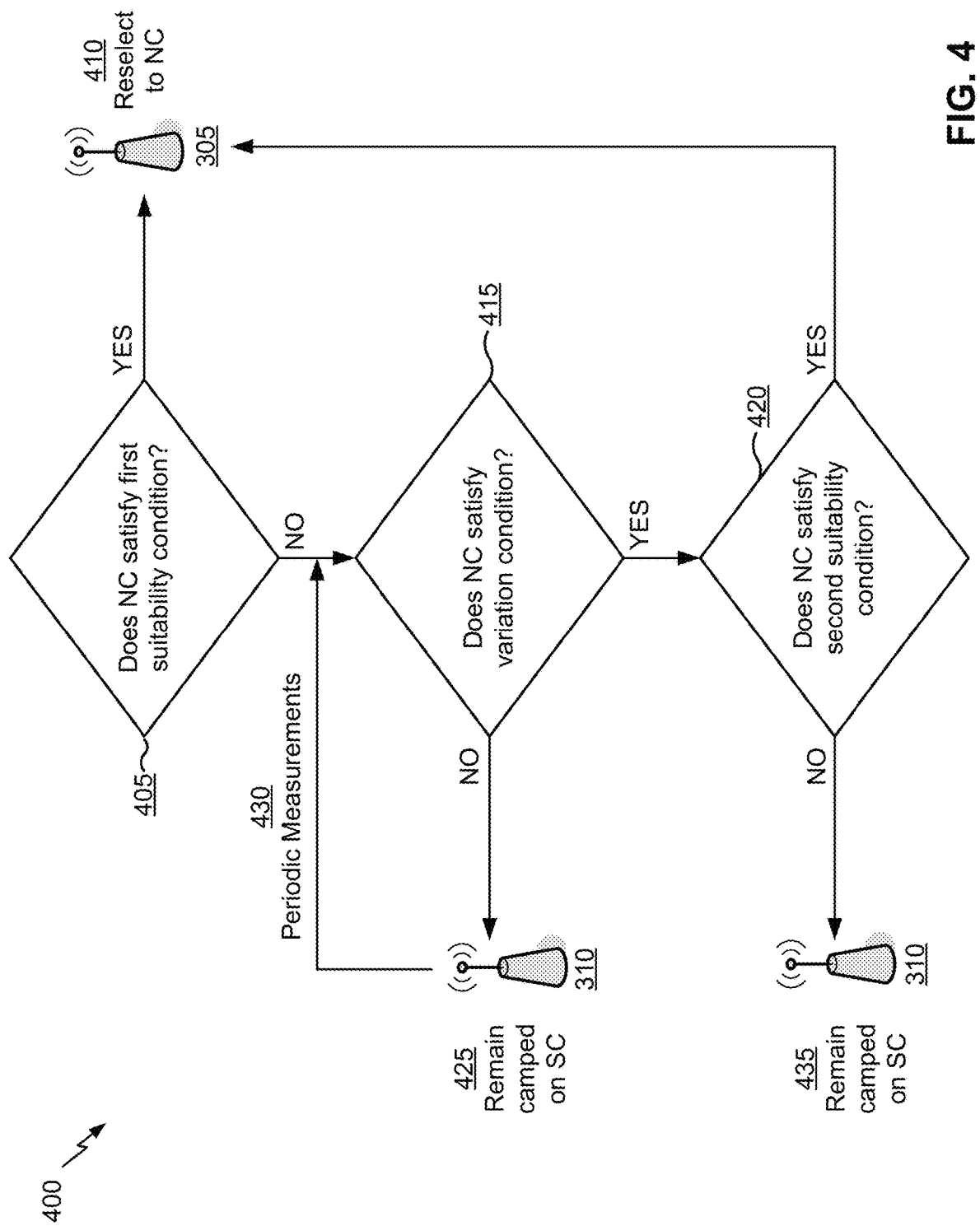
FIG. 4 is a diagram illustrating an example of cell reselection to a high priority neighbor cell, in accordance with various aspects of the present disclosure.

FIG. 4 is a diagram illustrating an example 400 of cell reselection to a high priority neighbor cell, in accordance with various aspects of the present disclosure.

As shown by reference number 405, a UE 120 may determine whether a neighbor cell (NC) 305 satisfies a first suitability condition. In some aspects, the neighbor cell 305 may have a higher priority than a serving cell (SC) 310 on which the UE 120 is camped. Additionally, or alternatively, the neighbor cell 305 and the serving cell 310 may have different frequencies (e.g., for inter-frequency reselection). In some aspects, one or more operations described herein may be performed based at least in part on a determination that the NC 305 has a higher priority than the SC 310 and/or based at least in part on a determination that the NC 305 and the SC 310 have different frequencies.

In some aspects, the UE 120 may test one or more conditions before determining whether the NC 305 satisfies the first suitability condition. For example, the UE 120 may determine whether the serving cell RSRP satisfies a threshold (e.g., −120 dBm), whether a neighbor cell signal parameter satisfies a threshold. (e.g., −120 dBm), and/or whether a neighbor cell RSRQ satisfies a threshold with respect to the serving cell RSRQ (e.g., is equal to or greater than the serving cell RSRQ, or is worse than the serving cell RSRQ by an amount that is less than a threshold, such as 5 dB). In some aspects, if the serving cell RSRP is greater than −120 dBm, the neighbor cell RSRP is greater than −120 dBm, and the neighbor cell RSRQ satisfies the threshold with respect to the serving cell RSRQ, then the UE 120 may proceed to determine whether the NC 305 satisfies the first suitability condition.

In some aspects, the UE 120 may determine whether the neighbor cell 305 satisfies the first suitability condition by measuring a neighbor cell (NC) signal parameter indicative of an RF condition of the neighbor cell 305, by measuring a serving cell (SC) signal parameter indicative of an RF condition of the serving cell 310, by normalizing the NC signal parameter and the SC signal parameter, and by comparing the normalized NC signal parameter and the normalized SC signal parameter. The NC signal parameter and/or the SC signal parameter may include, for example, an S criteria, Srxlev, RSRP, RSRQ, RSSI, SINR, and/or the like.

In some aspects, the UE 120 may calculate a normalized NC suitability value using the NC signal parameter, may calculate a normalized SC suitability value using the SC signal parameter, and may compare the normalized NC suitability value and the normalized SC suitability value. The UE 120 may determine whether the neighbor cell 305 satisfies the first suitability condition based at least in part on the comparison.

For example, referring back to FIG. 3, the UE 120 may initially detect the neighbor cell 305 at time t1. At this time, the UE 120 may use the first suitability condition to determine whether to reselect to the neighbor cell 305. For example, the UE 120 may calculate the normalized SC suitability value $S_{suitability}$ and the normalized NC suitability value $T_{suitability}$ as follows, where $S_{t1}$ represents an SC signal parameter (e.g., RSRP and/or the like) at time t1 (e.g., when the NC 305 is first detected), $T_{t1}$ represents an NC signal parameter (e.g., RSRP and/or the like) at time t1, and dBm_default represents a default dBm value used for normalization. In some aspects, the default dBm value may be −120 dBm to indicate suitability of the SC 310 and the NC 305 relative to a cell edge.

$$S_{suitability} = \left(1 - \left|\frac{S_{t1}}{dBm\_default}\right|\right)\%$$

$$T_{suitability} = \left(1 - \left|\frac{T_{t1}}{dBm\_default}\right|\right)\%$$

By normalizing the signal parameters of the serving cell 310 and the neighbor cell 305 as described above, variations in measurement results (e.g., due to wideband measurements on the serving cell 310 and narrowband measurements on the neighbor cell 305, due to different frequencies of the cells, and/or the like) may be reduced or eliminated.

As indicated above, the UE 120 may compare the normalized SC suitability value and the normalized NC suitability value to determine whether the NC 305 satisfies the first suitability condition (e.g., to determine whether to reselect to the NC 305). In some aspects, if the normalized NC suitability value satisfies a threshold, with respect to the normalized SC suitability value, then the UE 120 may reselect to the NC 305, as shown by reference number 410. For example, if a difference between the normalized NC suitability value and the normalized SC suitability value (e.g., $T_{suitability}$ minus $S_{suitability}$) satisfies a threshold (e.g., is greater than or equal to −5% and/or the like), then the UE 120 may reselect to the NC 305 (e.g., after expiration of a reselection timer for NC 305). Additionally, or alternatively, if the NC signal parameter is below a threshold (e.g., if RSRP is less than −120 dBm, and/or the like), then the UE 120 may determine that the NC 305 does not satisfy the first suitability condition.

However, if the first suitability condition is not satisfied (e.g., if the difference between the normalized NC suitability value and the normalized SC suitability value does not satisfy the threshold), then the UE 120 may determine whether the NC 305 satisfies a variation condition, as shown by reference number 415. In some aspects, the UE 120 may determine whether the NC 305 satisfies the variation condition by comparing multiple NC measurements (e.g., of NC signal parameters) to an NC reference measurement, comparing multiple SC measurements (e.g., of SC signal parameters) to an SC reference measurement, by calculating a normalized NC variation value and a normalized SC variation value based at least in part on the respective measurements, and by comparing the normalized NC variation value and the normalized SC variation value.

For example, referring back to FIG. 3, the UE 120 may measure signal parameters of the NC 305 and the SC 310 over time, such as at a first time t1, a second time t2, a third time t3, an nth time tn, and so on. In some aspects, the UE 120 may use an NC measurement at time t1 (or a different NC measurement) as an NC reference measurement, and may compare other NC measurements to the NC reference measurement to determine an NC variation value. Similarly, the UE 120 may use an SC measurement at time t1 (or a different SC measurement) as an SC reference measurement, and may compare other SC measurements to the SC reference measurement to determine an SC variation value.

For example, the UE 120 may calculate the SC variation value $\Delta S_{n-1}$ and the NC variation value $\Delta T_{n-1}$ as follows, where $S_{t1}$ represents an SC reference measurement (e.g., RSRP and/or the like) at time t1 (e.g., when the NC 305 is first detected), $T_{t1}$ represents an NC reference measurement (e.g., RSRP and/or the like) at time t1, $S_{tn}$ represents an SC measurement at time tn, and $T_{tn}$ represents an NC measurement at time tn.

$$\Delta S_{n-1} = \sum_{n=2}^{\infty} (S_{tn} - S_{t1})$$

$$\Delta T_{n-1} = \sum_{n=2}^{\infty} (T_{tn} - T_{t1})$$

By calculating the variation values as described above, the UE 120 may compare variations of SC measurements over time and variations of NC measurements over time. A comparison of these variations may indicate whether the NC 305 has improved with respect to the SC 310, as described in more detail below.

In some aspects, the UE 120 may calculate a normalized NC variation value using the NC variation value (e.g., based at least in part on comparing multiple NC cell measurements and an NC reference measurement, as described above), may calculate a normalized SC variation value using the SC variation value (e.g., based at least in part on comparing multiple SC cell measurements and an SC reference measurement, as described above), and may compare the normalized NC variation value and the normalized SC variation value. The UE 120 may determine whether the neighbor cell 305 satisfies the variation condition based at least in part on a comparison.

For example, the UE 120 may calculate the normalized SC variation value $S_{variation}$ and the normalized NC variation value $T_{variation}$ as follows.

$$S_{variation} = \left[\frac{\Delta S_{n-1}}{|S_{t1}|}\right]\%$$

$$T_{variation} = \left[\frac{\Delta T_{n-1}}{|T_{t1}|}\right]\%$$

By normalizing the variation values of the serving cell 310 and the neighbor cell 305 as described above, variations in measurement results (e.g., due to wideband measurements on the serving cell 310 and narrowband measurements on the neighbor cell 305, due to different frequencies of the cells, and/or the like) may be reduced or eliminated.

As indicated above, the UE 120 may compare the normalized SC variation value and the normalized NC variation value to determine whether the NC 305 satisfies the variation condition. In some aspects, if the normalized NC variation value satisfies a threshold, with respect to the normalized SC variation value, then the UE 120 may determine whether the NC 305 satisfies a second suitability condition, as shown by reference number 420. For example, if a difference between the normalized NC variation value and the normalized SC variation value (e.g., $T_{variation}$ minus $S_{variation}$) satisfies a threshold (e.g., is greater than or equal to 5% and/or the like), then the UE 120 may determine whether the NC 305 satisfies a second suitability condition, as described in more detail below. If the threshold is satisfied, this may indicate that the NC 305 has improved over time beyond a threshold as compared to the SC 310, which may indicate that the UE 120 is entering a better coverage area of the NC 305.

However, if the variation condition is not satisfied (e.g., if the difference between the normalized NC variation value and the normalized SC variation value does not satisfy the threshold), then the UE 120 may remain camped on the SC 310, as shown by reference number 425. As shown by reference number 430, the UE 120 may continue to obtain NC measurements and SC measurements (e.g., at future times shown in FIG. 3), may update the normalized SC variation value and the normalized NC variation value using such measurements, and may determine whether the normalized NC variation value satisfies a threshold with respect to the normalized SC variation value, as described above. This process may continue until the normalized NC variation value satisfies a threshold or the NC signal parameter can no longer be detected by the UE 120.

As shown by reference number 420, if the NC 305 satisfies the variation condition, then the UE 120 may determine whether the NC 305 satisfies a second suitability condition. In some aspects, the second suitability condition is the same as the first suitability condition, except the second suitability condition may use an SC signal parameter and an NC signal parameter measured at time tn (e.g., a measurement that results in the variation condition being satisfied), rather than time t1. For example, the UE 120 may calculate a normalized NC suitability value using the NC signal parameter, may calculate a normalized SC suitability value using the SC signal parameter, and may compare the normalized NC suitability value and the normalized SC suitability value. The UE 120 may determine whether the neighbor cell 305 satisfies the second suitability condition based at least in part on the comparison.

For example, referring back to FIG. 3, the UE 120 may determine that the neighbor cell 305 satisfies the variation condition at time tn. At this time, the UE 120 may use the second suitability condition to determine whether to reselect to the neighbor cell 305. For example, the UE 120 may calculate the normalized SC suitability value $S_{n\text{-}suitability}$ and the normalized NC suitability value $T_{n\text{-}suitability}$ as follows, where $S_{tn}$ represents an SC signal parameter (e.g., RSRP and/or the like) at time tn (e.g., when the NC 305 satisfies the variation condition), $T_{tn}$ represents an NC signal parameter (e.g., RSRP and/or the like) at time tn, and dBm_default represents a default dBm value used for normalization. In some aspects, the default dBm value may be −120 dBm to indicate suitability of the SC 310 and the NC 305 relative to a cell edge.

$$S_{n\text{-}suitability} = \left(1 - \left|\frac{S_{tn}}{\text{dBm\_default}}\right|\right)\%$$

$$T_{n\text{-}suitability} = \left(1 - \left|\frac{T_{tn}}{\text{dBm\_default}}\right|\right)\%$$

By normalizing the signal parameters of the serving cell 310 and the neighbor cell 305 as described above, variations in measurement results (e.g., due to wideband measurements on the serving cell 310 and narrowband measurements on the neighbor cell 305, due to different frequencies of the cells, and/or the like) may be reduced or eliminated.

As indicated above, the UE 120 may compare the normalized SC suitability value and the normalized NC suitability value to determine whether the NC 305 satisfies the second suitability condition (e.g., to determine whether to reselect to the NC 305). In some aspects, if the normalized NC suitability value satisfies a threshold, with respect to the normalized SC suitability value, then the UE 120 may reselect to the NC 305, as shown by reference number 410. For example, if a difference between the normalized NC suitability value and the normalized SC suitability value (e.g., $T_{n\text{-}suitability}$ minus $S_{n\text{-}suitability}$) satisfies a threshold (e.g., is greater than or equal to −5% and/or the like), then the UE 120 may reselect to the NC 305 (e.g., after expiration of a reselection timer for NC 305).

However, if the second suitability condition is not satisfied (e.g., if the difference between the normalized NC suitability value and the normalized SC suitability value does not satisfy the threshold), then the UE 120 may remain camped on the SC 310, as shown by reference number 435.

By performing such a second suitability test after the variation condition is satisfied, the UE 120 may ensure that the NC 305 has sufficiently strong RF conditions to reselect to the NC 305 after determining that the NC 305 has improved sufficiently relative to the SC 310. Without performing such a test, the UE 120 may experience ping-ponging and/or radio link failure due to relatively weak RF conditions on the NC 305.

As indicated above, FIG. 4 is provided as an example. Other examples are possible and may differ from what was described with respect to FIG. 4.

Figure 5:
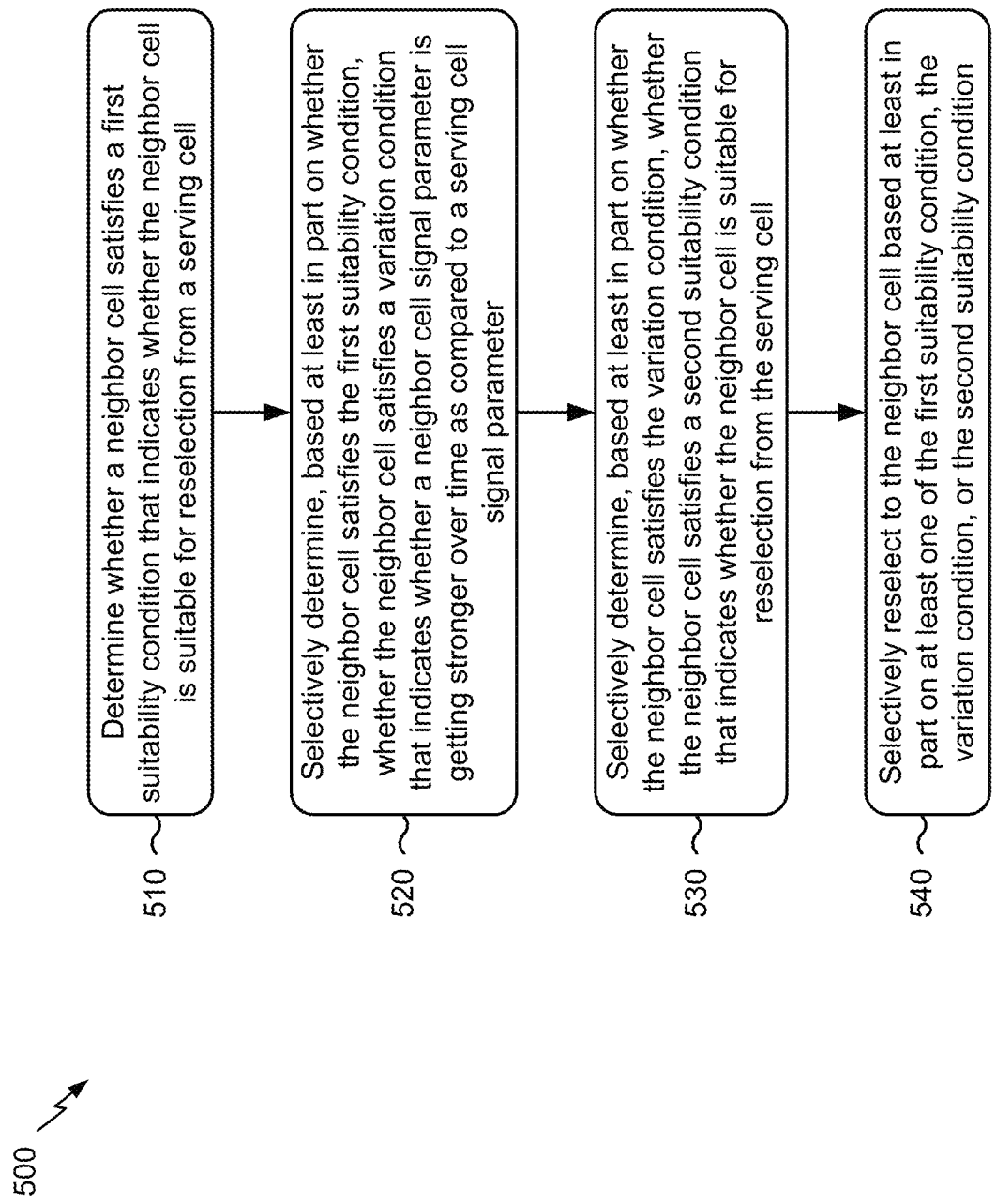
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with cell reselection to a high priority neighbor cell.

As shown in FIG. 5, in some aspects, process 500 may include determining whether a neighbor cell satisfies a first suitability condition that indicates whether the neighbor cell is suitable for reselection from a serving cell (block 510). For example, the UE (e.g., using antenna 252, DEMOD 254, MIMO detector 256, receive processor 258, controller/processor 280, and/or the like) may determine whether a neighbor cell satisfies a first suitability condition that indicates whether the neighbor cell is suitable for reselection from a serving cell, as described above in connection with FIG. 4.

As further shown in FIG. 5, in some aspects, process 500 may include selectively determining, based at least in part on whether the neighbor cell satisfies the first suitability condition, whether the neighbor cell satisfies a variation condition that indicates whether the neighbor cell is getting stronger over time as compared to the serving cell (block 520). For example, the UE (e.g., using antenna 252, DEMOD 254, MIMO detector 256, receive processor 258, controller/processor 280, and/or the like) may selectively determine, based at least in part on whether the neighbor cell satisfies the first suitability condition, whether the neighbor cell satisfies a variation condition that indicates whether the neighbor cell is getting stronger over time as compared to the serving cell, as described above in connection with FIG. 4.

As further shown in FIG. 5, in some aspects, process 500 may include selectively determining, based at least in part on whether the neighbor cell satisfies the variation condition, whether the neighbor cell satisfies a second suitability condition that indicates whether the neighbor cell is suitable for reselection from the serving cell (block 530). For example, the UE (e.g., using antenna 252, DEMOD 254, MIMO detector 256, receive processor 258, controller/processor 280, and/or the like) may selectively determine, based at least in part on whether the neighbor cell satisfies the variation condition, whether the neighbor cell satisfies a second suitability condition that indicates whether the neighbor cell is suitable for reselection from the serving cell, as described above in connection with FIG. 4.

As further shown in FIG. 5, in some aspects, process 500 may include selectively reselecting to the neighbor cell based at least in part on at least one of the first suitability condition, the variation condition, or the second suitability condition (block 540). For example, the UE (e.g., using controller/processor 280, transmit processor 264, TX MIMO processor 266, MOD 254, antenna 252, and/or the like) may selectively reselect to the neighbor cell based at least in part on at least one of the first suitability condition, the variation condition, or the second suitability condition, as described above in connection with FIG. 4.

Process 500 may include additional aspects, such as any single aspect or any combination of aspects described below and/or in connection with one or more other processes described elsewhere herein.

In some aspects, the neighbor cell has a higher priority than the serving cell. In some aspects, at least one of the determination of whether the neighbor cell satisfies the first suitability condition, the determination of whether the neighbor cell satisfies the variation condition, or the determination of whether the neighbor cell satisfies the second suitability condition is performed based at least in part on a determination that the neighbor cell has a higher priority than the serving cell. In some aspects, the neighbor cell and the serving cell have different frequencies.

In some aspects, determining whether the neighbor cell satisfies the first suitability condition comprises: measuring a neighbor cell signal parameter and a serving cell signal parameter; calculating a normalized neighbor cell suitability value based at least in part on the neighbor cell signal parameter; calculating a normalized serving cell suitability value based at least in part on the serving cell signal parameter; and determining whether the neighbor cell satisfies the first suitability condition based at least in part on a comparison of the normalized neighbor cell suitability value and the normalized serving cell suitability value. In some aspects, selectively determining whether the neighbor cell satisfies the variation condition comprises: determining whether the neighbor cell satisfies the variation condition when the normalized neighbor cell suitability value does not satisfy a threshold with respect to the normalized serving cell suitability value, or reselecting to the neighbor cell, without determining whether the neighbor cell satisfies the variation condition, when the normalized neighbor cell suitability value satisfies the threshold with respect to the normalized serving cell suitability value.

In some aspects, determining whether the neighbor cell satisfies the variation condition comprises: comparing a plurality of neighbor cell measurements and a neighbor cell reference measurement; comparing a plurality of serving cell measurements and a serving cell reference measurement; calculating a normalized neighbor cell variation value based at least in part on comparing the plurality of neighbor cell measurements and the neighbor cell reference measurement; calculating a normalized serving cell variation value based at least in part on comparing the plurality of serving cell measurements and the serving cell reference measurement; and determining whether the neighbor cell satisfies the variation condition based at least in part on a comparison of the normalized neighbor cell variation value and the normalized serving cell variation value. In some aspects, selectively determining whether the neighbor cell satisfies the second suitability condition comprises: determining whether the neighbor cell satisfies the second suitability condition when the normalized neighbor cell variation value satisfies a threshold with respect to the normalized serving cell variation value, or remaining camped on the serving cell, without determining whether the neighbor cell satisfies the second suitability condition, when the normalized neighbor cell variation value does not satisfy the threshold with respect to the normalized serving cell variation value.

In some aspects, determining whether the neighbor cell satisfies the second suitability condition comprises: measuring a neighbor cell signal parameter and a serving cell signal parameter; calculating a normalized neighbor cell suitability value based at least in part on the neighbor cell signal parameter; calculating a normalized serving cell suitability value based at least in part on the serving cell signal parameter; and determining whether the neighbor cell satisfies the second suitability condition based at least in part on a comparison of the normalized neighbor cell suitability value and the normalized serving cell suitability value. In some aspects, selectively reselecting to the neighbor cell based at least in part on at least one of the first suitability condition, the variation condition, or the second suitability condition comprises: reselecting to the neighbor cell when the normalized neighbor cell suitability value satisfies a threshold with respect to the normalized serving cell suitability value, or remaining camped on the serving cell when the normalized neighbor cell suitability value does not satisfy the threshold with respect to the normalized serving cell suitability value.

In some aspects, selectively reselecting to the neighbor cell based at least in part on at least one of the first suitability condition, the variation condition, or the second suitability condition comprises: determining that the neighbor cell does not satisfy the first suitability condition; determining that the neighbor cell satisfies the variation condition after determining that the neighbor cell does not satisfy the first suitability condition; determining that the neighbor cell satisfies the second suitability condition after determining that the neighbor cell satisfies the variation condition; and reselecting to the neighbor cell based at least in part on determining that the neighbor cell satisfies the second suitability condition.

In some aspects, selectively reselecting to the neighbor cell based at least in part on at least one of the first suitability condition, the variation condition, or the second suitability condition comprises: determining that the neighbor cell satisfies the first suitability condition; and reselecting to the neighbor cell, without determining whether the neighbor cell satisfies the variation condition or the second suitability condition, based at least in part on determining that the neighbor cell satisfies the first suitability condition. In some aspects, the first suitability condition and the second suitability condition are the same.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a neighbor cell does not satisfy a first suitability condition that indicates whether the neighbor cell is suitable for reselection from a serving cell;
    determining, based at least in part on the determination that the neighbor cell does not satisfy the first suitability condition, that the neighbor cell satisfies a variation condition that indicates whether the neighbor cell is getting stronger over time as compared to the serving cell;
    determining, based at least in part on the determination that the neighbor cell satisfies the variation condition, the neighbor cell satisfies a second suitability condition that indicates the neighbor cell is suitable for reselection from the serving cell; and selectively reselecting to the neighbor cell based at least in part on the determination whether the neighbor cell satisfies the second suitability condition.

2. The method of claim 1, wherein the neighbor cell has a higher priority than the serving cell.

3. The method of claim 1, wherein at least one of the determination that the neighbor cell does not satisfy the first suitability condition, the determination that the neighbor cell satisfies the variation condition, or the determination of the neighbor cell satisfies the second suitability condition is performed based at least in part on a determination that the neighbor cell has a higher priority than the serving cell.

4. The method of claim 1, wherein the neighbor cell and the serving cell have different frequencies.

5. The method of claim 1, wherein determining that the neighbor cell does not satisfy the first suitability condition comprises:

measuring a neighbor cell signal parameter and a serving cell signal parameter;

calculating a normalized neighbor cell suitability value based at least in part on the neighbor cell signal parameter;

calculating a normalized serving cell suitability value based at least in part on the serving cell signal parameter; and determining that the neighbor cell does not satisfy the first suitability condition based at least in part on a comparison of the normalized neighbor cell suitability value and the normalized serving cell suitability value.

6. The method of claim 5, wherein determining that the neighbor cell satisfies the variation condition comprises:

determining that the neighbor cell satisfies the variation condition when the normalized neighbor cell suitability value does not satisfy a threshold with respect to the normalized serving cell suitability value.

7. The method of claim 1, wherein determining that the neighbor cell satisfies the variation condition comprises:

comparing a plurality of neighbor cell measurements and a neighbor cell reference measurement;

comparing a plurality of serving cell measurements and a serving cell reference measurement;

calculating a normalized neighbor cell variation value based at least in part on comparing the plurality of neighbor cell measurements and the neighbor cell reference measurement;

calculating a normalized serving cell variation value based at least in part on comparing the plurality of serving cell measurements and the serving cell reference measurement; and determining that the neighbor cell satisfies the variation condition based at least in part on a comparison of the normalized neighbor cell variation value and the normalized serving cell variation value.

8. The method of claim 7, wherein determining whether the neighbor cell satisfies the second suitability condition comprises:

determining whether the neighbor cell satisfies the second suitability condition when the normalized neighbor cell variation value satisfies a threshold with respect to the normalized serving cell variation value.

9. The method of claim 1, wherein determining whether the neighbor cell satisfies the second suitability condition comprises:

measuring a neighbor cell signal parameter and a serving cell signal parameter;

calculating a normalized neighbor cell suitability value based at least in part on the neighbor cell signal parameter;

calculating a normalized serving cell suitability value based at least in part on the serving cell signal parameter; and determining whether the neighbor cell satisfies the second suitability condition based at least in part on a comparison of the normalized neighbor cell suitability value and the normalized serving cell suitability value.

10. The method of claim 9, wherein selectively reselecting to the neighbor cell comprises:

reselecting to the neighbor cell when the normalized neighbor cell suitability value satisfies a threshold with respect to the normalized serving cell suitability value, or remaining camped on the serving cell when the normalized neighbor cell suitability value does not satisfy the threshold with respect to the normalized serving cell suitability value.

11. The method of claim 1, wherein selectively reselecting to the neighbor cell comprises:

reselecting to the neighbor cell when the neighbor cell satisfies the second suitability condition.

12. The method of claim 1, wherein the first suitability condition and the second suitability condition are the same.

13. A user equipment (UE) for wireless communication, comprising:

a memory; and one or more processors operatively coupled to the memory, the memory and the one or more processors configured to:

determine that a neighbor cell does not satisfy a first suitability condition that indicates whether the neighbor cell is suitable for reselection from a serving cell;

determine, based at least in part on the determination that the neighbor cell does not satisfy the first suitability condition, that the neighbor cell satisfies a variation condition that indicates whether the neighbor cell is getting stronger over time as compared to the serving cell;

determine, based at least in part on the determination that the neighbor cell satisfies the variation condition, whether the neighbor cell satisfies a second suitability condition that indicates whether the neighbor cell is suitable for reselection from the serving cell; and selectively reselect to the neighbor cell based at least in part on the determination whether the neighbor cell satisfies the second suitability condition.

14. The UE of claim 13, wherein the neighbor cell has a higher priority than the serving cell.

15. The UE of claim 13, wherein at least one of the determination that the neighbor cell does not satisfy the first suitability condition, the determination that the neighbor cell satisfies the variation condition, or the determination of whether the neighbor cell satisfies the second suitability condition is performed based at least in part on a determination that the neighbor cell has a higher priority than the serving cell.

16. The UE of claim 13, wherein the neighbor cell and the serving cell have different frequencies.

17. The UE of claim 13, wherein the one or more processors, when determining that the neighbor cell does not satisfy the first suitability condition, are configured to:

measure a neighbor cell signal parameter and a serving cell signal parameter;
calculate a normalized neighbor cell suitability value based at least in part on the neighbor cell signal parameter;
calculate a normalized serving cell suitability value based at least in part on the serving cell signal parameter; and
determine that the neighbor cell does not satisfy the first suitability condition based at least in part on a comparison of the normalized neighbor cell suitability value and the normalized serving cell suitability value.

18. The UE of claim 17, wherein the one or more processors, when determining that the neighbor cell satisfies the variation condition, are configured to:
determine that the neighbor cell satisfies the variation condition when the normalized neighbor cell suitability value does not satisfy a threshold with respect to the normalized serving cell suitability value.

19. The UE of claim 13, wherein the one or more processors, when determining that the neighbor cell satisfies the variation condition, are configured to:
compare a plurality of neighbor cell measurements and a neighbor cell reference measurement;
compare a plurality of serving cell measurements and a serving cell reference measurement;
calculate a normalized neighbor cell variation value based at least in part on comparing the plurality of neighbor cell measurements and the neighbor cell reference measurement;
calculate a normalized serving cell variation value based at least in part on comparing the plurality of serving cell measurements and the serving cell reference measurement; and
determine that the neighbor cell satisfies the variation condition based at least in part on a comparison of the normalized neighbor cell variation value and the normalized serving cell variation value.

20. The UE of claim 19, wherein the one or more processors, when determining whether the neighbor cell satisfies the second suitability condition, are configured to:
determine whether the neighbor cell satisfies the second suitability condition when the normalized neighbor cell variation value satisfies a threshold with respect to the normalized serving cell variation value.

21. The UE of claim 13, wherein the one or more processors, when determining whether the neighbor cell satisfies the second suitability condition, are configured to:
measure a neighbor cell signal parameter and a serving cell signal parameter;
calculate a normalized neighbor cell suitability value based at least in part on the neighbor cell signal parameter;
calculate a normalized serving cell suitability value based at least in part on the serving cell signal parameter; and
determine whether the neighbor cell satisfies the second suitability condition based at least in part on a comparison of the normalized neighbor cell suitability value and the normalized serving cell suitability value.

22. The UE of claim 21, wherein the one or more processors, when selectively reselecting to the neighbor cell, are configured to:
reselect to the neighbor cell when the normalized neighbor cell suitability value satisfies a threshold with respect to the normalized serving cell suitability value, or
remain camped on the serving cell when the normalized neighbor cell suitability value does not satisfy the threshold with respect to the normalized serving cell suitability value.

23. The UE of claim 13, wherein the one or more processors, when selectively reselecting to the neighbor cell, are configured to:
reselect to the neighbor cell when the neighbor cell satisfies the second suitability condition.

24. A non-transitory computer-readable medium storing one or more instructions for wireless communication, the one or more instructions comprising:
one or more instructions that, when executed by one or more processors of a user equipment (UE), cause the one or more processors to:
determine that a neighbor cell does not satisfy a first suitability condition that indicates whether the neighbor cell is suitable for reselection from a serving cell;
determine, based at least in part on the determination that the neighbor cell does not satisfy the first suitability condition, that the neighbor cell satisfies a variation condition that indicates whether the neighbor cell is getting stronger over time as compared to the serving cell;
determine, based at least in part on the determination that the neighbor cell satisfies the variation condition, whether the neighbor cell satisfies a second suitability condition that indicates the neighbor cell is suitable for reselection from the serving cell; and
selectively reselect to the neighbor cell based at least in part on the determination whether the neighbor cell satisfies the second suitability condition.

25. The non-transitory computer-readable medium of claim 24, wherein the neighbor cell has a higher priority than the serving cell.

26. The non-transitory computer-readable medium of claim 24, wherein the neighbor cell and the serving cell have different frequencies.

27. An apparatus for wireless communication, comprising:
means for determining that a neighbor cell does not satisfy a first suitability condition that indicates whether the neighbor cell is suitable for reselection from a serving cell;
means for determining, based at least in part on the determination that the neighbor cell does not satisfy the first suitability condition, that the neighbor cell satisfies a variation condition that indicates the neighbor cell is getting stronger over time as compared to the serving cell;
means for determining, based at least in part on the determination that the neighbor cell satisfies the variation condition, whether the neighbor cell satisfies a second suitability condition that indicates the neighbor cell is suitable for reselection from the serving cell; and
means for selectively reselecting to the neighbor cell based at least in part on the determination whether the neighbor cell satisfies the second suitability condition.

28. The apparatus of claim 27, wherein the neighbor cell has a higher priority than the serving cell.

29. The apparatus of claim 27, further comprising:
means for determining, before determining that the neighbor cell does not satisfy the first suitability condition, that a reference signal received power (RSRP) of the serving cell or the neighbor cell satisfies a threshold.

30. The apparatus of claim 27, further comprising:
   means for determining, before determining that the neighbor cell does not satisfy the first suitability condition, that a reference signal received quality (RSRQ) satisfies a threshold with respect to a RSRQ of the neighbor cell.

\* \* \* \* \*